United States Patent [19]

Bott

[11] 4,302,896
[45] Dec. 1, 1981

[54] LICENSE PLATE FRAME ASSEMBLY

[76] Inventor: John A. Bott, 931 Lakeshore Dr., Grosse Point Shores, Mich. 48236

[21] Appl. No.: 168,539

[22] Filed: Jul. 14, 1980

[51] Int. Cl.$^3$ ............................................. G09F 7/00
[52] U.S. Cl. .................................... 40/209; 40/10 R
[58] Field of Search ................. 40/10 R, 10 A, 16 R, 40/17, 204, 209, 210, 200

[56] References Cited

U.S. PATENT DOCUMENTS

| | | | |
|---|---|---|---|
| 1,776,618 | 9/1930 | Chadwick | 40/209 |
| 2,765,553 | 10/1956 | Audette | 40/209 |
| 2,791,046 | 5/1957 | Goldberg | 40/209 |
| 3,389,486 | 6/1968 | Trammell | 40/209 |
| 4,182,062 | 1/1980 | Krokos et al. | 40/209 |

*Primary Examiner*—Gene Mancene
*Assistant Examiner*—Wenceslao J. Contreras
*Attorney, Agent, or Firm*—Harness, Dickey & Pierce

[57] ABSTRACT

A license plate frame assembly is disclosed as consisting of a one-piece frame member which may be fabricated of a molded plastic material, a die stamped metal or the like. The frame is of a generally rectangular configuration and has a frontal wall that provides a decorative face which may be provided with a hot stamped complementary decorated surface. The frame member also includes rearwardly projecting outer enclosure walls and is adapted to be connected to an associated license plate and support bracket by having recesses formed along the rearward side of the upper and side sections of the frame member slipped or slid onto the upper and side edges of the associated license plate and support bracket in an envelope-like manner. The recesses may be formed by integral tabs formed on the rearward side of the outer enclosure walls. The lower section of the frame member may have integral tabs on the front side thereof for fastening the frame to the license plate and in turn to the support bracket, through conventional mounting holes.

12 Claims, 10 Drawing Figures

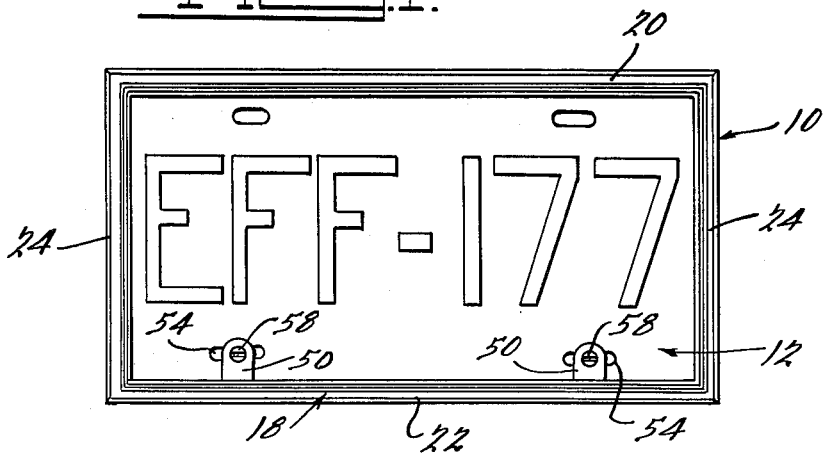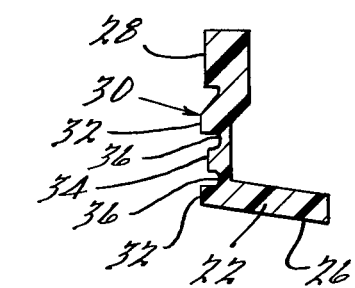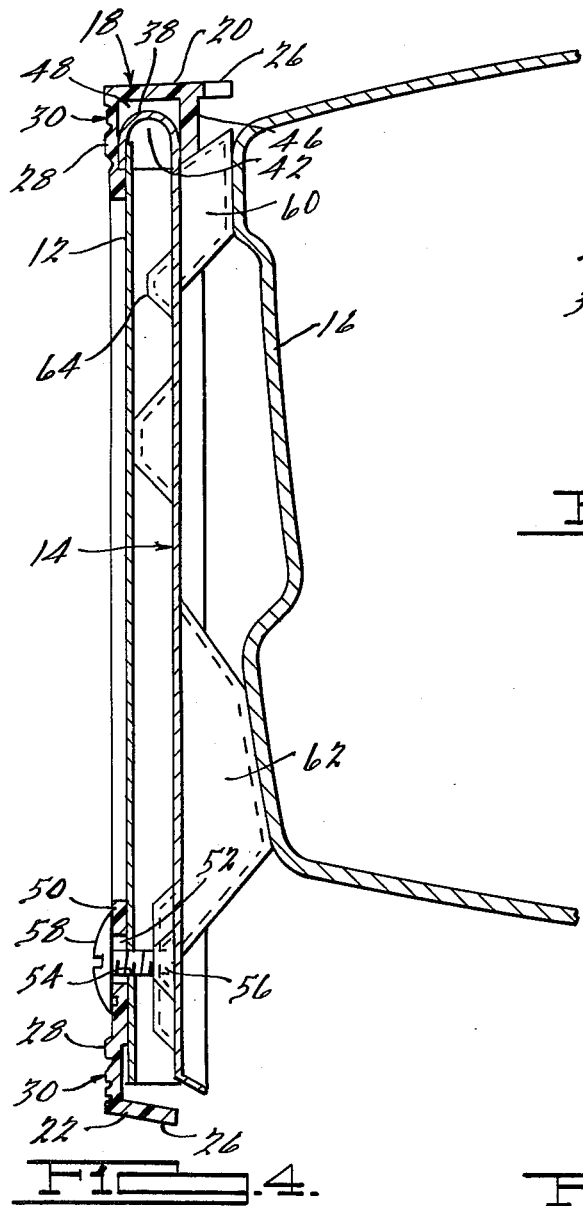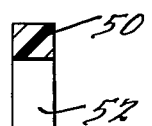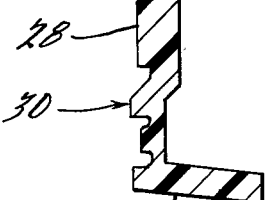

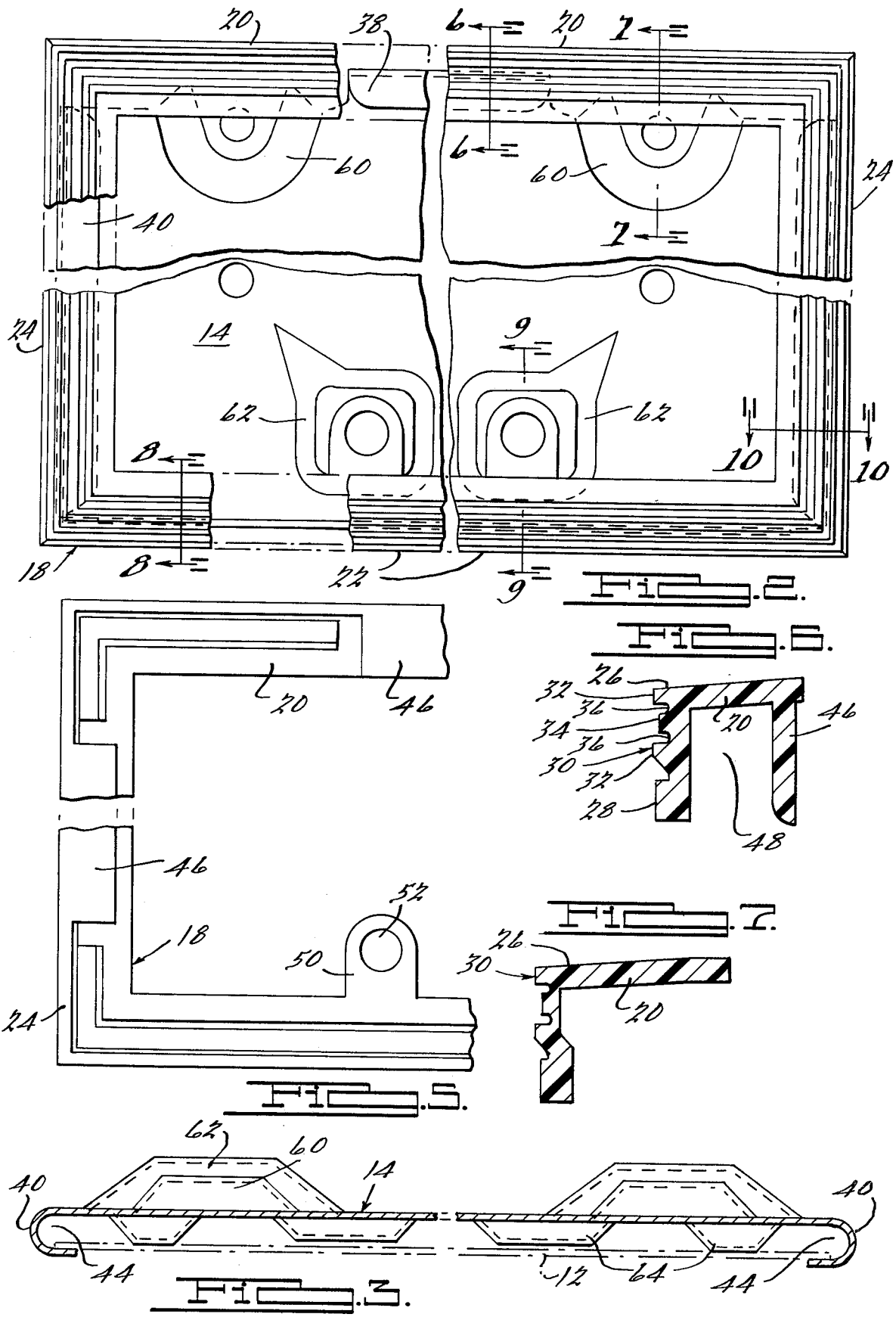

LICENSE PLATE FRAME ASSEMBLY

BACKGROUND AND SUMMARY OF THE INVENTION

This invention relates generally to means for protecting and improving the appearance of vehicle license plates and the like, and more particularly, to a new and improved license plate frame assembly which is adapted to be secured directly to the license plate and associated support bracket, and serve the two-fold purpose of enhancing the appearance thereof and protecting the plate from damage.

In order to further protect and support vehicle license plates, some vehicle manufacturers have recently strengthened the construction of the license plate mounting and support bracket which is typically attached to the front bumper of a vehicle, by adding rolled edges of the top and both sides of the support bracket. Because of their inherent resistance to twisting and deformation, especially about horizontal and vertical axes, these rolled edges help prevent bending and distortion of the license plate. However, it is thus necessary to provide a license plate frame assembly construction which is compatible with this new support bracket design. U.S. Pat. No. 4,170,838, for example, discloses a license plate frame assembly usable on a support bracket having rolled edges only on its vertical sides, and as such is not adapted for use with a support bracket also having a rolled edge on its top horizontal portion.

It is accordingly a general object of the present invention to provide a new and improved license plate frame assembly for automotive license plates and the like.

It is a more particular object of the present invention to provide a new and improved license frame assembly that is attractive in appearance and which may be positively secured to the associated license plate and support bracket in a manner so as to assure against inadvertent disassembly.

It is another object of the present invention to provide a new and improved license plate frame assembly which includes attachment means that is operable to permit assembly of the frame member of the license plate even after the license plate has been secured to the associated vehicle.

It is yet another object of the present invention to provide a new and improved license plate frame assembly that is relatively easy to install by simply slipping it on to the associated license plate and support bracket in an envelope-like manner.

It is a further object of the present invention to provide a new and improved license plate frame assembly wherein the frame member may be provided with a decorative frontal face in order to enhance or complement the decor of the associated vehicle.

It is yet another object of the present invention to provide a new and improved license plate frame assembly, as above described, which may be fabricated of a one-piece molded polymeric material or may be fabricated of a die-cast metal or the like.

It is a further object of the present invention to provide a new and improved license plate frame assembly which is of a relatively simple design, is economical to manufacture, and will have a long and effective operational life.

It is still a further object of the present invention to provide a new and improved license plate frame assembly, as above described, which may, for certain applications, be fixedly secured to the associated license plate without requiring any ancillary fastening clips or the like.

Other objects and advantages of the present invention will become apparent from the following detailed description taken in conjunction with the accompanying drawings.

BRIEF DESCRIPTION OF THE DRAWINGS

FIG. 1 is a front elevational view of one preferred embodiment of the license plate frame assembly of the present invention, as shown in operative association with a typical automotive vehicle license plate;

FIG. 2 is an enlarged fragmentary front elevational view, partially broken away, of the frame assembly of FIG. 1 (not including the license plate), as shown in operative association with a vehicle license plate mounting or support bracket;

FIG. 3 is a longitudinal sectional view of the support bracket of FIG. 2 with a license plate being shown therein as a broken line structure;

FIG. 4 is a transverse sectional view of the frame assembly and bracket of FIG. 2 (including a license plate) as shown in operative association with a vehicle bumper;

FIG. 5 is an enlarged fragmentary elevational view, partially broken away, of the rearward side of the frame member only incorporated in the frame assembly shown in FIG. 1;

FIG. 6 is an enlarged transverse cross-sectional view of only the frame member shown in FIG. 2, taken substantially along the line 6—6 of FIG. 2;

FIG. 7 is an enlarged transverse cross-sectional view of only the frame member shown in FIG. 2, taken substantially along the line 7—7 of FIG. 2;

FIG. 8 is an enlarged transverse cross-sectional view of only the frame member shown in FIG. 2, taken substantially along the line 8—8 of FIG. 2;

FIG. 9 is an enlarged transverse cross-sectional view of only the frame member shown in FIG. 2, taken substantially along the line 9—9 of FIG. 2; and FIG. 10 is an enlarged transverse cross-sectional view of only the frame member shown in FIG. 2, taken substantially along the line 10—10 of FIG. 2.

DESCRIPTION OF THE PREFERRED EMBODIMENTS

Referring now in detail to the drawings and in particular to FIGS. 1-5 thereof, a license plate frame assembly 10, in accordance with one preferred embodiment of the present invention, is shown in operative association with a conventional license plate 12. The plate 12, which has a width dimension of approximately twice its height dimension, is mounted within a vehicle license plate mounting or support bracket 14, which bracket is in turn secured to a vehicle bumper 16, as best seen in FIG. 4. The bracket 14 may be connected to the bumper 16 in a conventional manner such as by bolts or the like (not shown) passing through the bracket at the points where it contacts the bumper face. The assembly 10 comprises a frame structure or member 18 which overlies the outer marginal edges of the forward face of the license plate 12 and encloses its outer periphery. Toward this end, the frame 18, which is generally rectangular in shape, comprises upper and lower horizontally extending sections, 20 and 22 respectively, and vertically disposed end sections 24 which extend between and are integrally connected to the opposite ends of the horizontal sections 20 and 22. Each of the frame sections 20, 22, and 24 comprise an outer enclosure wall portion 26 which is arranged at substantially right angles to the plane of the license plate 12, as well as an integral frontal wall portion 28 that extends substantially parallel to the plane of the license plate and inwardly from the forwardmost part of the associated outer enclosure wall portion. The frontal wall portions 28 thus provide an unobstructed rectangular opening having linear side edges through which the forward face of the license plate may be viewed. In order to enhance the aesthetic appearance of the license plate frame assembly of the present invention, and as best seen in FIGS. 6-10, the frontal wall portions 28 may be provided with a decorative face area 30 which may include a pair of spaced parallel forwardly projecting ribs 32 between which is located an intermediate recessed surface area 34 provided with an appearance enhancing treatment, the recessed area 34 being defined by a pair of spaced parallel recesses 36. Such an appearance enhancing treatment may include any suitable matching or contrasting decorative material which may, for example, be formed by a suitable hot stamping operation with a leather-like or woodgrain texture. The forwardly projecting ribs 32 protect the intermediate recessed surface area 34 from the deleterious effects of car washing brushes, flying objects, such as stones, and the like.

As best seen in FIGS. 2-4, the support bracket 14, which is provided on a vehicle by the vehicle manufacturer, is of generally rectangular shape and is about the same size as the license plate 12 which it is made to support and protect. The support bracket 12 has an upper horizontally extending rolled edge 38 which extends over a significant portion of its width, and two spaced vertically extending rolled edges 40, which extend over a significant portion of the vertical sides of the support bracket 40. These rolled edges 38 and 40 are rolled outwardly so as to define an upper horizontal recess 42 and two vertical recesses 44 for receiving the upper horizontally extending edge portion and the two side vertically extending edge portions of the license plate 12. The support bracket 14 contains two upper recessed areas 60 and two lower recessed areas 62 which function primarily in mounting the bracket 14 to the vehicle bumper 16. In addition, other raised areas 64 may be provided for structural reasons or to aid in positioning the license plate 12. The outer enclosure wall portions 26 and the frontal wall portions 28 of the upper horizontal section 20 and vertical end sections 24 of the frame cooperate to conceal the rolled edge portions 38 and 40 of the support bracket 14.

As best seen in FIGS. 4 and 5, as well as in the cross-sectional views of FIGS. 6 and 10, the upper horizontal section 20 and the vertical edge sections 24 of the frame 18 contain integrally formed plate retaining flange elements 46 or tabs on their rearward side. It should, however, be appreciated that the upper horizontal flange element is not required in order to practice the present invention. Along with the outer wall portions 26 and the frontal wall portions 28 of the associated frame sections, the flange elements 46 define recesses 48 for receiving the edges of the license plate 12 and adjacent support bracket 14. By way of illustration, FIG. 4 shows a recess 48 defined by outer wall portion 26, frontal wall portion 28, and flange element 46. Within this recess 48 is received the upper horizontally extending rolled edge 38 of the support bracket 14 which surrounds the upper horizontally edge portion of the license plate 12. The thickness or width of the recesses 48 is approximately equal to the lateral thickness of the upper horizontal and vertically spaced rolled edges, 38 and 40 respectively, on the support bracket 14. As shown in these figures, the flange elements 46 are located on the rearward side of the license plate 12 and support bracket 14, and thus are totally concealed from the forward side of the frame by the plate 12 and support bracket 14, when the plate is assembled into the frame.

As best seen in FIGS. 1, 4, 5, and 9, the frontal wall portions 28 of the lower horizontally extending section 22 of the frame member 18, includes two tabs 50 which are integral with the frontal wall portion 28 and extend upwardly therefrom over the forward face of the license plate 12. The tabs 50 have openings 52 therein which are positioned so as to be alignable with fastener receiving openings 54 in the license plate, and fastener receiving means 56 in the support bracket 14. Thus the frame 18 may be secured to the plate 12 which in turn is secured to the support bracket 14 by means of a screw or bolt 58, although other securing means are believed to be usable and are believed to be well within the level of expertise of one skilled in this art. Needless to say, the screws 58 pass through the conventional slots or openings 54 in the license plate to a suitable support bracket 14. Suitable elastomeric bumpers or the like (not shown) may be provided between the rearward side of the plate 12 and the support bracket 14 for reducing relative vibrational movement of the plate.

As best shown in FIGS. 6-10, the upper and lower horizontally extending sections 20 and 22, and the vertically disposed end sections 24 are of generally uniform outward appearance, and are of substantially similar cross-sectional shape, with the exception of the plate retaining flange elements 46 referred to hereinabove, as well as slight differences in the size of the outer enclosure wall portions 26, as will be referred to hereinbelow. The frame 18 and its various sections, portions, and elements are preferably fabricated of a suitable molded polymeric material, such as A.B.S. plastic, high impact polystyrene, or the like, whereby the frame 18 may be fabricated of a one-piece utilized or molded construction. It will be appreciated, of course, that the frame structure 18 may be fabricated of various other materials and may, for example, consist of a metallic die stamping or the like without departing from the scope of the present invention.

In order to effect assembly of the frame structure 18 into the license plate 12, the vertically lowermost ends of the plate edge receiving recesses 48 of the vertical end sections 24 are first positioned directly above the vertically uppermost ends of the two spaced, vertically extending rolled edges 40 of the support bracket 14. Of course, the license plate 12 would be pre-positioned within the support bracket 14 prior to this time. Then the frame 18 and vertical recesses 48 are slipped or slid onto the vertical rolled edges in an envelope-like manner and moved in a vertically downward direction until the upper horizontal edge 38 of the bracket 14 and of course the upper horizontal edge portion of the license plate are received within the recess 48 defined in part by the upper horizontal plate retaining flange 46. It should be appreciated that even if no separate flange is formed on the rearward side of the upper horizontally extending section 20 of the frame member 18, that the frame assembly would still be appropriately positioned by the outer enclosure wall portion 26 on the upper horizontally extending section 20. It should be expected that some resistance to downward sliding of the frame member may be experienced due to the outer enclosure wall portion 26 on the lower horizontally extending frame section 22, but such resistance should be relatively slight and may be regulated in part by the size and flexibility of the subject outer enclosure wall portion 26, and in part by the flexibility of the frame member 18 as a whole. In addition, the entire frame member 18 would be appropriately dimensioned so as to not rattle nor produce unreasonable or annoying vibrations when secured to a vehicle.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. In combination a license plate frame adapted for cooperation with a license plate having a width dimension of approximately twice its height dimension, and a support bracket, said support bracket being of a generally rectangular shape and having an upper horizontally extending rolled edge and two spaced vertically extending rolled edges, said rolled edges defining recesses for receiving the upper horizontally extending edge portion and the two side vertically extending edge portions of said plate, means for securing said plate to said support bracket, and means for securing said support bracket to a portion of a motor vehicle, said frame being of a generally rectangular shape and comprising upper and lower horizontally extending sections and vertically disposed end sections extending between and integrally connected to the opposite ends of said horizontal sections, each of said frame sections comprising an outer enclosure wall portion arranged at substantially right angles to the plane of said license plate, and an integral frontal wall portion that extends substantially parallel to the plane of the license plate and inwardly from the forwardmost part of the associated outer enclosure wall portion, said outer enclosure wall portions and said frontal wall portions of said upper horizontal and vertical end sections of said frame cooperating to conceal the rolled edge portions of said support bracket, said frontal wall portions overlying the outer marginal edge portions of the forward face of said license plate and providing an unobstructed rectangular opening having linear side edges through which the forward face of the license plate may be viewed, plate retaining flange elements formed integrally of said vertical end sections on said frame, said flange elements defining plate edge receiving recesses with said outer and frontal wall portions of the associated frame sections and being located on the rearward side of said license plate and thus being totally concealed from the forward side of said frame by said plate when the same is assembled into said frame, whereby assembly of said frame to said license plate and support bracket may be achieved by positioning the vertically lowermost ends of said plate edge receiving recesses over the vertically uppermost ends of the two spaced, vertically extending rolled edges of said bracket, and then sliding said frame in a vertically downward direction toward its normal position.

2. The combination as set forth in claim 1 wherein a horizontal plate retaining flange element is formed integrally of said upper horizontally extending section of said frame.

3. The combination as set forth in claim 2 wherein the plate edge receiving recess defined in part by said horizontal plate retaining flange element receives the top horizontal edge of said bracket and of said license plate.

4. The combination as set forth in claim 1 wherein the frontal wall portion of the lower horizontally extending section of said frame includes two spaced apart upwardly attending tabs having openings therein positioned so as to be alignable with fastener receiving openings in said license plate.

5. In combination a license plate frame adapted for cooperation with a license plate having a width dimension of approximately twice its height dimension, and a support bracket, said support bracket being of a generally rectangular shape and having an upper horizontally extending rolled edge and two spaced vertically extending rolled edges, said rolled edges defining recesses for receiving the upper horizontally extending edge portion and the two side vertically extending edge portions of said plate, means for securing said plate to said support bracket, and means for securing said support bracket to a portion of a motor vehicle, said frame being of a generally rectangular shape and comprising upper and lower horizontally extending sections and vertically disposed end sections extending between and integrally connected to the opposite ends of said horizontal sections, each of said frame sections comprising an outer enclosure wall portion arranged at substantially right angles to the plane of said license plate, and an integral frontal wall portion that extends substantially parallel to the plane of the license plate and inwardly from the forwardmost part of the associated outer enclosure wall portion, said outer enclosure wall portions and said frontal wall portions of said upper horizontal and vertical end sections of said frame cooperating to conceal the rolled edge portions of said support bracket, said frontal wall portions overlying the outer marginal edge portions of the forward face of said license plate and providing an unobstructed rectangular opening having linear side edges through which the forward face of the license plate may be viewed, plate retaining flange elements formed integrally of said upper horizontal and vertical end sections on said frame, said flange elements defining plate edge receiving recesses with said outer and frontal wall portions of the associated frame sections and being located on the rearward side of said license plate and thus being totally concealed from the forward side of said frame by said plate when the same is assembled into said frame, whereby assembly of said frame to said license plate and support bracket may be achieved by positioning the vertically lowermost ends of the plate edge receiving recesses of said vertical end sections over the vertically uppermost ends of the two spaced, vertically extending rolled edges of said bracket, and then sliding said frame in a vertically downward direction toward its normal position, until the upper horizontal edges of said bracket and license plate are received within the recess defined in part by said horizontal plate retaining flange.

6. The combination as set forth in claim 5 wherein the frontal wall portion on the lower horizontally extending section of said frame includes two spaced apart upwardly extending tabs having openings therein positioned so as to be alignable with fastener receiving openings in said license plate.

7. In combination a license plate frame adapted for cooperation with a license plate having a width dimension of approximately twice its height dimension and having a pair of spaced apart fastener receiving openings formed adjacent its lower horizontally extending edge, and a support bracket, said support bracket being of a generally rectangular shape and having an upper horizontally extending rolled edge and two spaced vertically extending rolled edges, said rolled edges defining recesses for receiving the upper horizontally extending edge portion and the two side vertically extending edge portions of said plate, and having openings adapted to be aligned with said openings formed in said plate, and means for securing said support bracket to a portion of a motor vehicle, said frame being of a generally rectangular shape and comprising upper and lower horizontally extending sections and vertically disposed end sections extending between and integrally connected to the opposite ends of said horizontal sections, each of said frame sections comprising an outer enclosure wall portion arranged at substantially right angles to the plane of said license plate, and an integral frontal wall portion that extends substantially parallel to the plane of the license plate and inwardly from the forwardmost part of the associated outer enclosure wall portion, said outer enclosure wall portions and said frontal wall portions of said upper horizontal and vertical end sections of said frame cooperating to conceal the rolled edge portions of said support bracket, said frontal wall portions overlying the outer marginal edge portions of the forward face of said license plate and providing an unobstructed rectangular opening having linear side edges through which the forward face of the license plate may be viewed, plate retaining flange elements formed integrally of said upper horizontal and vertical edge sections on said frame, said flange elements defining plate edge receiving recesses with said outer and frontal wall portions of the associated frame sections and being located on the rearward side of said license plate and thus being totally concealed from the forward side of said frame by said plate when the same is assembled into said frame, said frontal wall portion on the lower horizontally extending section of said frame including upwardly extending tab means having openings therein positioned so as to be alignable with the fastener receiving openings in the license plate, whereby assembly of said frame to said license plate and support bracket may be achieved by positioning the vertically lowermost ends of the plate edge receiving recesses of said vertical end sections over the vertically uppermost ends of the two spaced, vertically extending rolled edges of said bracket, and then sliding said frame in a vertically downward direction toward its normal position, until the upper horizontal edges of said bracket and license plate are received within the recess defined in part by said horizontal plate retaining flange.

8. The combination as set forth in claim 7 wherein said tab means on the lower horizontally extending section of said frame includes two spaced apart upwardly extending tabs.

9. The combination as set forth in claim 7 wherein said license plate frame is one-piece molded plastic.

10. The combination as set forth in claim 9 wherein said license plate frame is fabricated from A.B.S. plastic.

11. The combination as set forth in claim 7 wherein said frontal wall portions include a decorative face area.

12. The combination as set forth in claim 11 wherein said decorative face areas include a pair of spaced parallel forwardly projecting ribs between which is located an intermediate recessed surface area provided with an appearance enhancing treatment, said ribs protecting said intermediate area from the deleterious effects of car washing brushes, flying objects, such as stones, and the like.

* * * * *